United States Patent
Hosomi et al.

(10) Patent No.: US 11,697,206 B2
(45) Date of Patent: Jul. 11, 2023

(54) ACCELERATION ADJUSTMENT APPARATUS AND NON-TRANSITORY COMPUTER-READABLE STORAGE MEDIUM STORING AN ACCELERATION ADJUSTMENT PROGRAM

(71) Applicant: OMRON Corporation, Kyoto (JP)

(72) Inventors: Shinichi Hosomi, Soraku-gun (JP); Akane Nakashima, Nara (JP); Akihiro Suzumura, Berkeley, CA (US); Ryoichi Kuratani, Kizugawa (JP)

(73) Assignee: OMRON CORPORATION, Kyoto (JP)

( * ) Notice: Subject to any disclaimer, the term of this patent is extended or adjusted under 35 U.S.C. 154(b) by 52 days.

(21) Appl. No.: 17/254,326

(22) PCT Filed: Mar. 11, 2019

(86) PCT No.: PCT/JP2019/009817
§ 371 (c)(1),
(2) Date: Dec. 21, 2020

(87) PCT Pub. No.: WO2020/017093
PCT Pub. Date: Jan. 23, 2020

(65) Prior Publication Data
US 2021/0213608 A1    Jul. 15, 2021

(30) Foreign Application Priority Data

Jul. 17, 2018 (JP) ................. 2018-134106

(51) Int. Cl.
*B25J 9/16*     (2006.01)
*B25J 13/08*    (2006.01)

(52) U.S. Cl.
CPC .......... *B25J 9/1651* (2013.01); *B25J 13/088* (2013.01)

(58) Field of Classification Search
CPC ...... B25J 9/1651; B25J 13/088; B25J 9/1664; B25J 9/1633; G05B 2219/39247
See application file for complete search history.

(56) References Cited

U.S. PATENT DOCUMENTS

| | | | |
|---|---|---|---|
| 5,811,952 A | | 9/1998 | Kato et al. |
| 9,975,244 B1 | * | 5/2018 | Nagarajan .............. B25J 9/1664 |
| (Continued) | | | |

FOREIGN PATENT DOCUMENTS

| | | |
|---|---|---|
| CN | 1903523 A | 1/2007 |
| CN | 106426176 A | 2/2017 |
| (Continued) | | |

OTHER PUBLICATIONS

S. Riazi, K. Bengtsson, R. Bischoff, A. Aurnhammer, O. Wigstrbm and B. Lennartson, "Energy and peak-power optimization of existing time-optimal robot trajectories," 2016 IEEE International Conference on Automation Science and Engineering (CASE), 2016, pp. 321-327, doi: 10.1109/COASE.2016.7743423. (Year: 2016).*

(Continued)

*Primary Examiner* — Abby Y Lin
*Assistant Examiner* — Dylan M Katz
(74) *Attorney, Agent, or Firm* — Metrolex IP Law Group, PLLC

(57) ABSTRACT

An acceleration adjustment apparatus may include a load calculation unit that calculates a peak value of a load that is estimated to act on a robot, based on a motion equation regarding a motion of the robot and a value of an acceleration of a joint of the robot in motion. The acceleration adjustment apparatus may further include an acceleration adjustment unit that executes at least one of a first adjustment in which, when the peak value of the load calculated by the load calculation unit is greater than a target value of the load acting on the robot when the robot is moving, the (Continued)

acceleration is adjusted to decrease, and a second adjustment in which, when the peak value of the load calculated by the load calculation unit is less than the target value, the acceleration is adjusted to increase.

8 Claims, 15 Drawing Sheets

(56) References Cited

U.S. PATENT DOCUMENTS

| | | | | |
|---|---|---|---|---|
| 2007/0021868 | A1 | 1/2007 | Nagatsuka et al. | |
| 2010/0305751 | A1* | 12/2010 | Nagatsuka | G06F 30/367 |
| | | | | 700/245 |
| 2011/0087373 | A1 | 4/2011 | Nagatsuka et al. | |
| 2011/0087375 | A1 | 4/2011 | Aurnhammer et al. | |
| 2013/0317646 | A1* | 11/2013 | Kimoto | G05B 19/425 |
| | | | | 700/250 |
| 2014/0201112 | A1 | 7/2014 | Sawada et al. | |
| 2014/0297031 | A1 | 10/2014 | Iwasaki | |
| 2015/0134111 | A1* | 5/2015 | Nakajima | B25J 9/1664 |
| | | | | 901/9 |
| 2015/0328774 | A1* | 11/2015 | Yajima | B25J 9/1674 |
| | | | | 702/183 |
| 2016/0271799 | A1* | 9/2016 | Sugio | B25J 9/1664 |

FOREIGN PATENT DOCUMENTS

| | | | |
|---|---|---|---|
| CN | 107139171 | A | 9/2017 |
| JP | H7-200030 | A | 8/1995 |
| JP | H9-16241 | A | 1/1997 |
| JP | H11-53021 | A | 2/1999 |
| JP | 2002-91572 | A | 3/2002 |
| JP | 2005-44230 | A | 2/2005 |
| JP | 2007-125645 | A | 5/2007 |
| JP | 2009-172721 | A | 8/2009 |
| JP | 2012-45641 | A | 3/2012 |
| JP | 2014-14875 | A | 1/2014 |
| JP | 2014-136275 | A | 7/2014 |
| JP | 2014-193520 | A | 10/2014 |
| JP | 2016-43439 | A | 4/2016 |

OTHER PUBLICATIONS

The extended European search report (EESR) dated Oct. 22, 2021 in a counterpart European patent application.
An English translation of the International Search Report ("ISR") of PCT/JP2019/009817 dated May 28, 2019.
The Written Opinion("WO") of PCT/JP2019/009817 dated May 28, 2019.
The Chinese Office Action dated Feb. 13, 2023 in a counterpart Chinese patent application.

* cited by examiner

ACCELERATION ADJUSTMENT APPARATUS AND NON-TRANSITORY COMPUTER-READABLE STORAGE MEDIUM STORING AN ACCELERATION ADJUSTMENT PROGRAM

CROSS-REFERENCES TO RELATED APPLICATIONS

This application claims priority to Japanese Patent Application No. 2018-134106 filed Jul. 17, 2018, the entire contents of which are incorporated herein by reference.

The present invention relates to an acceleration adjustment apparatus and an acceleration adjustment program.

RELATED ART

In order to realize high speed operations of robots provided with a robot arm, for example, parameters relating to operations of the robots on operation paths have been required to be manually adjusted. In such manual adjustment, it is necessary to find a parameter (operational command value for a robot) with which the robot is not subjected to an excessive load and a takt time is shortened, and this task has been a heavy burden on the user. In particular, when there are many variations of teaching points for teaching the operational path to the robot and passing points generated based on a path plan of the robot, it has been difficult to prepare parameters that are optimal in all cases in advance.

In view of this, a motion generation system that automatically determines parameters has been proposed (e.g., JP2014-136275A).

In the system disclosed in Patent Document 1, a movable range of a robot arm is divided into a plurality of spaces, and the jerk limiting condition of the joints is prepared in advance and used, according to which the load torque acting on the elements for transmitting a driving force falls within an allowable range in each of those spaces. In the system disclosed in Patent Document 1, the parameters are determined by solving an optimization problem in which the jerk limiting condition serves as an inequality constraint.

SUMMARY OF THE INVENTION

Problem to be Solved by the Invention

In the system disclosed in JP 2014-136275A, it is assumed that the jerk limiting condition in one divided space is constant. However, if one divided space is large, the inertia moment varies depending on the posture of the robot arm even in that one space. Thus, the assumption that the jerk limiting condition in one space is constant is not satisfied. Also, the size of a space obtained by division can be set by the user. However, it is not easy for a user to set the appropriate size of the space. Therefore, when a user whose level of learning about robots is low uses the technique disclosed in Patent Document 1, there is a problem in that an appropriate jerk of the robot cannot always be obtained.

The present invention has been made in view of the above-described aspects and provides an acceleration adjustment apparatus and an acceleration adjustment program that can adjust an acceleration that is a parameter of a robot regardless of the user's learning level.

Means for Solving the Problems

An aspect of the disclosure is an acceleration adjustment apparatus including a load calculation unit configured to calculate a peak value of a load that is estimated to act on a robot, based on a motion equation regarding a motion of the robot and a value of an acceleration of a joint of the robot in motion, and an acceleration adjustment unit configured to execute at least one of a first adjustment in which, when the peak value of the load calculated by the load calculation unit is greater than a target value of the load acting on the robot when the robot is moving, the acceleration is adjusted to decrease, and a second adjustment in which, when the peak value of the load calculated by the load calculation unit is less than the target value, the acceleration is adjusted to increase.

According to the above-described aspect, the acceleration adjustment unit can repeat the adjustment of the acceleration, and the load calculation unit can repeat the calculation on the peak value of the load, until the peak value of the load calculated based on the acceleration of the joint of the robot and the motion equation falls within a predetermined range including the target value.

According to the above-described first aspect, the trajectory along which the robot operates is divided into a plurality of sections, and the acceleration adjustment unit can adjust the acceleration for each section. Also, according to the above-described first aspect, the trajectory of the operation of the robot can be divided into the plurality of sections by separating at points at which the tendency of change of the angle value of the joint of the robot changes.

According to the above-described first aspect, when adjusting the acceleration, the acceleration adjustment unit can increase and decrease the acceleration by using the adjustment width designated by the user, the adjustment value obtained through the binary search method, or the adjustment value obtained through the gradient method.

A second aspect of the disclosure is an acceleration adjustment program for causing a computer to execute a load calculating step for calculating a peak value of a load that is estimated to act on a robot, based on a motion equation regarding a motion of the robot and a value of an acceleration of a joint of the robot in motion, and an acceleration adjustment step for executing at least one of a first adjustment in which, when the peak value of the load calculated in the load calculation step is greater than a target value of the load acting on the robot when the robot is moving, the acceleration is adjusted to decrease, and a second adjustment in which, when the peak value of the load calculated in the load calculation step is less than the target value, the acceleration is adjusted to increase.

According to the above-described second aspect, the adjustment of the acceleration in the acceleration adjustment step and the calculation on the peak value of the load in the load calculation step can be repeated until the peak value of the load calculated based on the acceleration of the joint of the robot and the motion equation falls within a predetermined range including the target value.

Effects of the Invention

According to this disclosure, an acceleration that is a parameter of a robot can be adjusted regardless of the user's learning level.

EMBODIMENTS OF THE INVENTION

Figure 1:
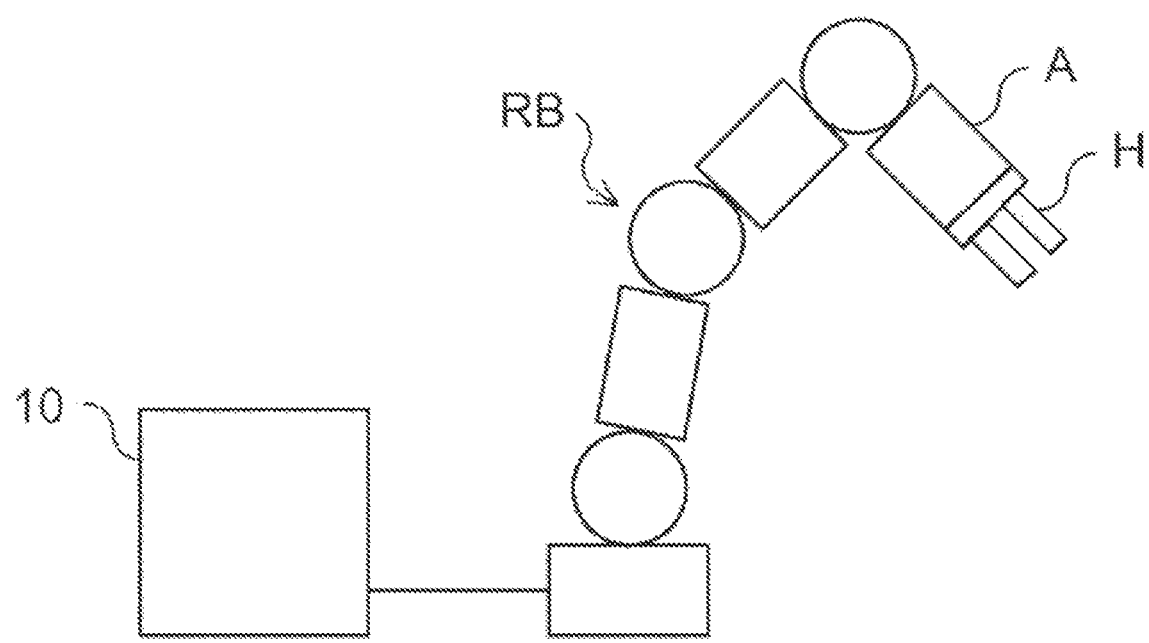
FIG. 1 is a diagram illustrating a schematic configuration of a robot and an acceleration adjustment apparatus.

Hereinafter, an example of embodiments of the present invention will be described with reference to the drawings. Note that the same or equivalent constituent elements are given the same reference numerals in the drawings. Also, in the drawings, the dimension ratios are exaggerated for the sake of convenience in description, and may be sometimes different from the actual ratios.

First Embodiment

FIG. 1 is a diagram showing a schematic configuration of a robot and an acceleration adjustment apparatus.

As shown in FIG. 1, an acceleration adjustment apparatus 10 is connected to a robot RB, and adjusts parameters (operation command values) used when the robot RB operates. The acceleration adjustment apparatus 10 may also be embedded in a control apparatus as one function of the control apparatus that controls the robot RB. The detailed configuration of the acceleration adjustment apparatus 10 will be described later.

The robot RB moves along a plurality of teaching points taught by the user, or a plurality of passing points generated based on a path plan. When moving, the robot RB follows various kinds of operation command values. Examples of the various kinds of operation command values include the maximum speed and the acceleration. The robot RB moves in accordance with the acceleration adjusted by the acceleration adjustment apparatus 10.

A robot hand H serving as an end effector is attached to the leading end of a robot arm A of the robot RB, for one example. In this case, the robot RB is a so-called pick-and-place robot that holds a workpiece at a predetermined location, and conveys the workpiece to a predetermined destination and places the workpiece at the destination. In another example, a tool serving as an end effector is attached to the robot RB. In this case, the robot RB moves in accordance with a taught path or a path based on a path plan, and performs predetermined processing such as welding, screwing, or inspection at a predetermined location.

Before illustrating the acceleration adjustment apparatus 10 in detail, the configuration of the robot RB will be illustrated. In the present embodiment, as one example, a case where the robot RB is a vertical articulated robot will be described. However, the present invention can also be applied to a horizontal articulated robot (scalar robot), a parallel-link robot, an orthogonal robot, a mobile robot, a flying robot (drone), a humanoid robot, or the like.

Figure 2:
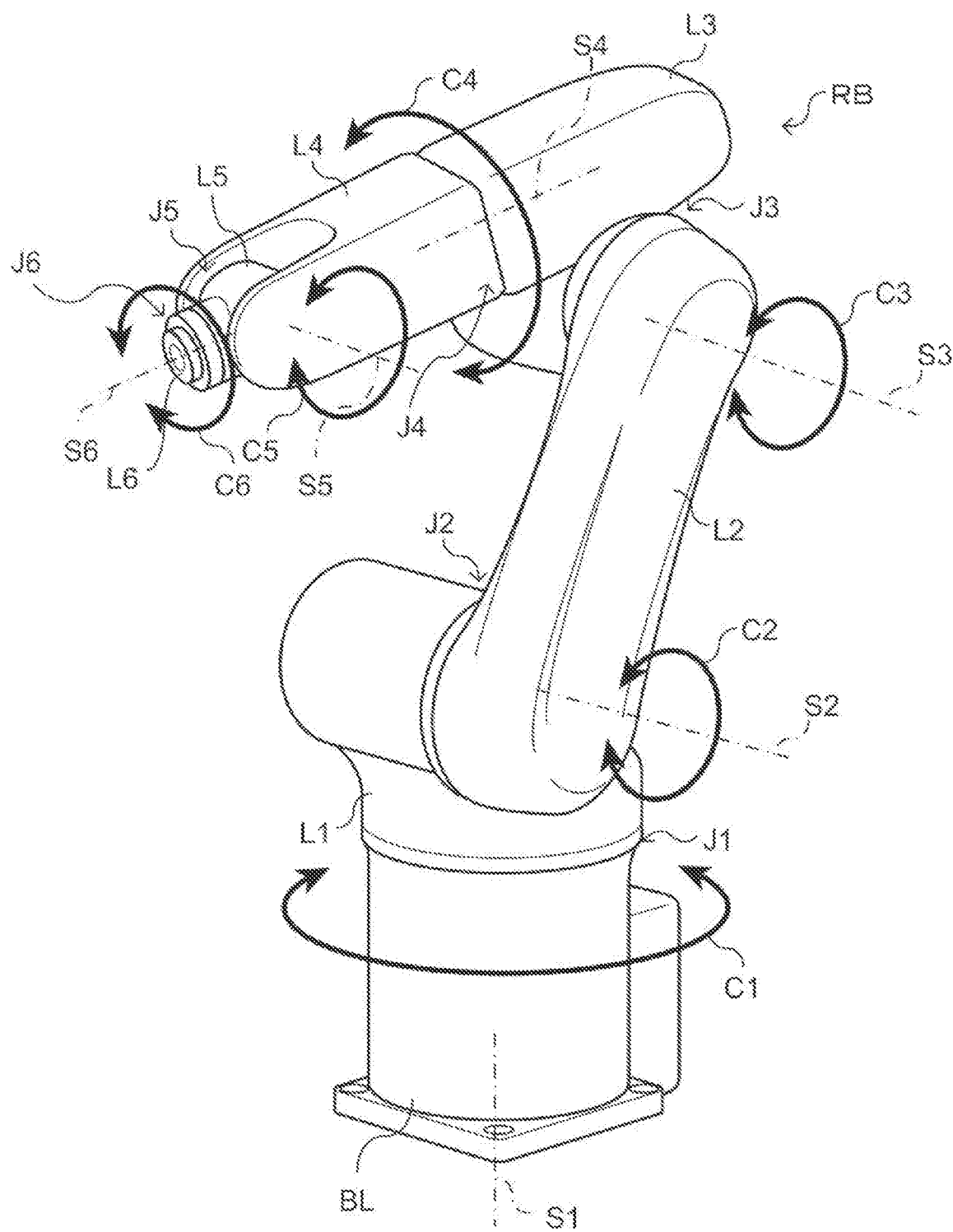
FIG. 2 is a diagram illustrating a configuration of a vertical articulated robot.

FIG. 2 is a diagram showing a configuration of a robot that is a vertical articulated robot.

As shown in FIG. 2, the robot RB is a hexaxial robot having six degrees of freedom provided with a base link BL, links L1 to L6, and joints J1 to J6. Note that "joints" means joints that connect links. The joints J1 to J6 connect the links to each other by motors (not shown) such that the links are rotatable. Hereinafter, the links L1 to L6 and a robot hand H connected to the link L6 are collectively called a robot arm. In this embodiment, a hexaxial robot is described as an example, but the number of the axes is not limited to six, and may be any number that is one or more. The number of links also varies depending on the number of axes.

In FIG. 2, the base link BL and the link L1 are connected with each other via the joint J1 that rotates about a vertical axis S1 in the direction of an arrow C1. Therefore, the link L1 rotates in the direction of the arrow C1 with the base link BL serving as a fulcrum.

In FIG. 2, the link L1 and the link L2 are connected with each other via the joint J2 that rotates about a horizontal axis S2 in the direction of an arrow C2. Therefore, the link L2 rotates in the direction of the arrow C2 with the joint J1 serving as a fulcrum.

In FIG. 2, the link L2 and the link L3 are connected with each other via the joint J3 that rotates about an axis S3 in the direction of an arrow C3. Therefore, the link L3 rotates in the direction of the arrow C3 with the joint J2 serving as a fulcrum.

In FIG. 2, the link L3 and the link L4 are connected with each other via the joint J4 that rotates about an axis S4 in the direction of an arrow C4. Therefore, the link L4 rotates in the direction of the arrow C4 with the joint J3 serving as a fulcrum.

In FIG. 2, the link L4 and the link L5 are connected with each other via the joint J5 that rotates about an axis S5 in the direction of an arrow C5. Therefore, the link L5 rotates in the direction of the arrow C5 with the joint J4 serving as a fulcrum.

In FIG. 2, the link L5 and the link L6 are connected with each other via the joint J6 that rotates about an axis S6 in the direction of an arrow C6. Therefore, the link L6 rotates in the direction of the arrow C6 with the joint J5 serving as a fulcrum. Note that although not shown in FIG. 2, the robot hand H is attached to the link L6.

A predetermined rotation angle range is set as a movable range for each of the joints J1 to J6.

The position of the tip hand of the robot RB or the posture of the robot RB is determined by the rotation angles of the joints J1 to J6. Accordingly, when teaching the path to the robot RB, the rotation angle values of the joints J1 to J6 are represented as vectors with the dimension of the number of axes included in the robot (in this embodiment, six-dimensional vectors), and the vectors are sequentially taught to the robot RB as the teaching points. If the path is generated instead of being taught as well, similarly, the passing points through which the robot RB passes are generated as the vectors with the dimension of the number of axes of the joints J1 to J6. Moreover, the maximum speed at a predetermined rotation angle is set for each of the joints J1 to J6. Note that in some cases, the vector data having the coordinate values on the orthogonal coordinate system is given as the operation path instead of the vector data having the angle values at the teaching points or the passing points. In this case, the coordinate values on the orthogonal coordinate system can be transformed to the angle values of the joints J1 to J6 based on the robot inverse kinematics. Also, the speed at which the robot RB moves is given to the robot RB as, for example, the maximum (angle) speed data and the (angle) acceleration data of the joints J1 to J6.

Next, the acceleration adjustment apparatus 10 will be described.

Figure 3:
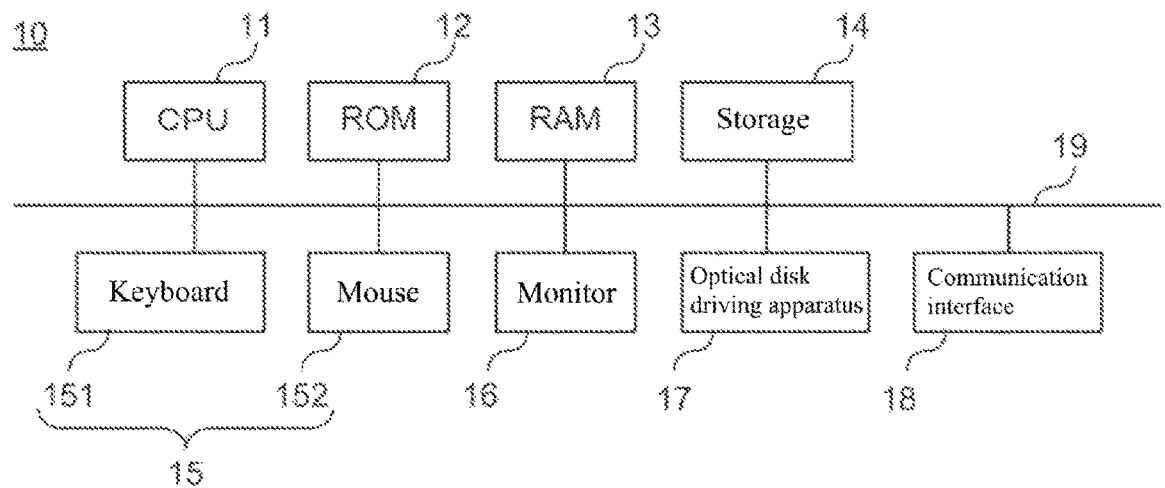
FIG. 3 is a block diagram illustrating the hardware configuration of an acceleration adjustment apparatus according to a first embodiment.

FIG. 3 is a block diagram showing the hardware configuration of an acceleration adjustment apparatus according to a first embodiment.

As shown in FIG. 3, the acceleration adjustment apparatus 10 includes a CPU (central processing unit) 11, a ROM (read only memory) 12, a RAM (random access memory) 13, a storage 14, an input unit 15, a monitor 16, an optical disk driving apparatus 17, and a communication interface 18. The constituent elements are communicatively connected to each other via a bus 19.

In this embodiment, the ROM 12 or the storage 14 stores an acceleration adjustment program for adjusting the acceleration to be supplied to the robot RB. The CPU 11 stands for "central processing unit", and executes various programs and controls constituent elements. Specifically, the CPU 11 reads out a program from the ROM 12 or the storage 14, and executes the program using the RAM 13 as a work region. The CPU 11 performs processing for controlling the above constituent elements and processing for various types of calculation in accordance with programs recorded in the ROM 12 or the storage 14.

The ROM 12 stores various programs and various types of data. The RAM 13 temporarily stores programs or data, as a work region. The storage 14 is constituted by an HDD (hard disk drive) or an SSD (solid state drive), and stores various programs, including an operating system, and various types of data.

The input unit 15 includes a keyboard 151 and a pointing device, such as a mouse 152, and is used for performing various types of input. The monitor 16 is a liquid crystal display, for example, and displays various types of information such as whether the workpiece is successfully suctioned. The monitor 16 may also function as the input unit 15 by adopting a touch panel system. The optical disk driving apparatus 17 reads out data stored in any of various recording media (a CD-ROM, a Blue-ray disk, etc.), writes data to a recording medium, and the like.

The communication interface 18 is an interface for communicating with another apparatus, and, for example, a standard of Ethernet (registered trademark), an FDDI, Wi-Fi (registered trademark), or the like is used.

Next, the functional configuration of the acceleration adjustment apparatus 10 will be described.

Figure 4:
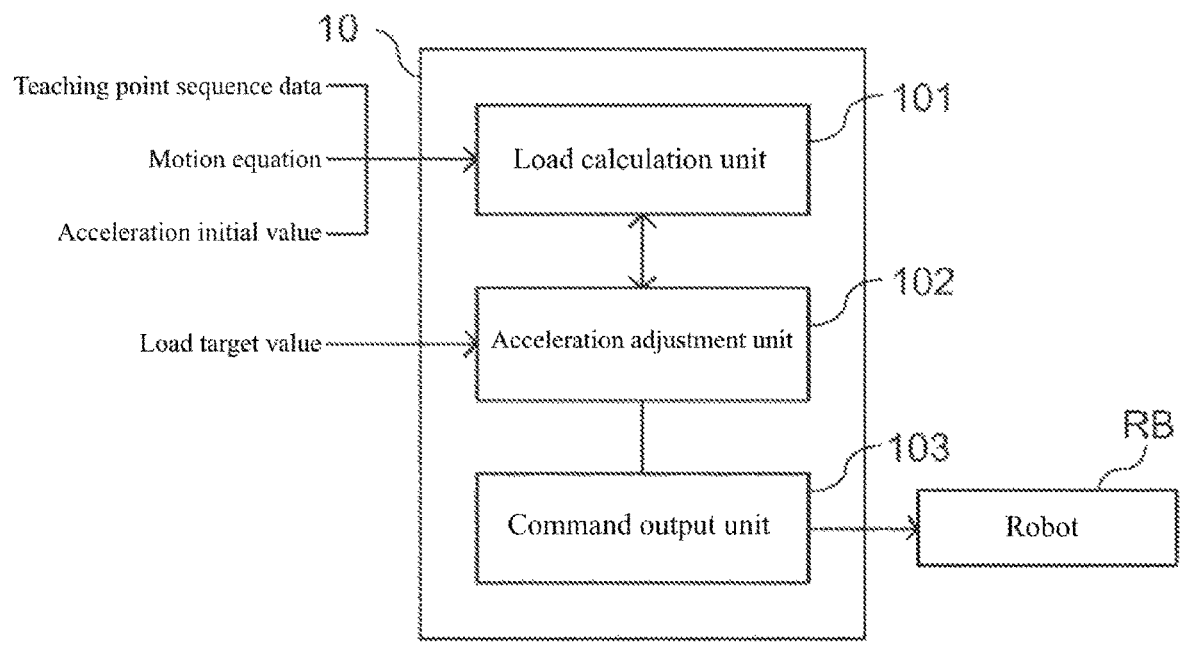
FIG. 4 is a block diagram illustrating an example of a functional configuration of the acceleration adjustment apparatus.

FIG. 4 is a block diagram showing an example of a functional configuration of the acceleration adjustment apparatus.

As shown in FIG. 4, the acceleration adjustment apparatus 10 includes a load calculation unit 101, an acceleration adjustment unit 102, and a command output unit 103 as functional constituent elements. The functional constituent elements are realized by the CPU 11 reading out an acceleration adjustment program stored in the ROM 12 or the storage 14, loading the program to the RAM 13, and executing the program.

The load calculation unit 101 acquires the teaching point sequence indicating the operation path of the robot RB, a motion equation used when the robot RB moves, and an initial value of the acceleration at the movement, as input data. The initial values of the teaching point sequence and the acceleration are appropriately determined in accordance with the object of the movement of the robot RB. Alternatively, the initial value of the acceleration may also be acquired as a randomly generated value. In this case, the user does not need to determine the initial value of the acceleration or input the initial value in advance, and thus the burden on the user can be reduced. Also, the motion equation can be obtained by analyzing and quantifying the relationship between the accelerations of the joints J1 to J6 of the robot RB when the robot RB moves and loads acting on the joints J1 to J6 of the robot RB, using a physics model of the robot RB or the like. The motion equation may include other factors such as external force acting on the links L1 to L6. The load is a mechanical or electrical energy including at least one of the torque acting on the joints J1 to J6, the change rate of the torque, the kinetic energy, and current and power to be supplied to the joints J1 to J6. In this embodiment, a case where the load is a torque acting on the joints J1 to J6 will be described as an example.

The load calculation unit 101 calculates the peak value of the load (hereinafter, "estimated load") that is estimated to act on the joints J1 to J6 of the robot RB, based on the motion equation regarding the movement of the robot RB and the value of the acceleration of the joints of the robot in motion. In other words, the load calculation unit 101 estimates, not the peak value of the load that actually acts on the robot RB, but the peak value of the load from the motion equation and the command value of the acceleration, as a logical value. Note that the peak value can be obtained as the highest load value over the entirety of the operation path of the robot RB.

The acceleration adjustment unit 102 acquires a load target value that is the target value of the load acting on the robot RB when the robot RB moves, as input data. The load target value may be set for each of the joints J1 to J6 of the robot RB, or may be set as a value common in the joints J1 to J6. The load target value is determined as appropriate in accordance with the specification of the robot RB. The load target value can be acquired, for example, as a value obtained by subtracting a predetermined margin value from the upper limit value of the load that is allowable with respect to the joints J1 to J6.

The acceleration adjustment unit 102 determines whether the peak values of the estimated loads of the joints J1 to J6 calculated by the load calculation unit 101 are values within a predetermined range including the load target value. If the peak values are not within a predetermined range, the acceleration adjustment unit 102 adjusts the command values of the acceleration (hereinafter called "command accelerations") with respect to the joints J1 to J6. The command accelerations are six-dimensional vectors having the acceleration values of the joints J1 to J6. The acceleration adjustment unit 102 performs at least one of a first adjustment in which the acceleration is adjusted to decrease when the peak value of the estimated load calculated by the load calculation unit 101 is greater than the load target value, and a second adjustment in which the acceleration is adjusted to increase when the peak value of the estimated load is less than the load target value.

The acceleration adjustment unit 102 outputs the adjusted acceleration value to the load calculation unit 101, and prompts the calculation of the load again. The calculation of the load and the adjustment of the acceleration are repeated until the peak value of the estimated load calculated by using the adjusted acceleration and the motion equation falls within a predetermined range including the load target value. Note that the predetermined range including the load target value is set as a range obtained by, taking the load target value as the center value, and increasing/decreasing the center value by a value α, for example. In this case, assuming that the above margin value is a, the upper limit of the predetermined range is the upper limit value of the allowable load. The greater α, the larger the variation from the load target value that is allowed. When the variation is large, the accuracy, which means the proximity to the load target value, is low. The user may also determine the value α in accordance with the allowable accuracy. Alternatively, the greater the value α is, the more the number of repetitions of the acceleration adjustment, that is performed until the peak value of the estimated load falls within a predetermined range, decreases. Accordingly, the user may determine the value α in accordance with the adjustment time of the allowable acceleration. The value α may also be 0. The acceleration adjustment unit 102 inputs the acceleration for which the adjustment is finally made to the command output unit 103.

The command output unit 103 outputs, to the robot RB, the acceleration adjusted by the acceleration adjustment unit 102 as the command value of the movement of the robot RB.

Next, the operations of the acceleration adjustment apparatus 10 will be described.

Figure 5:
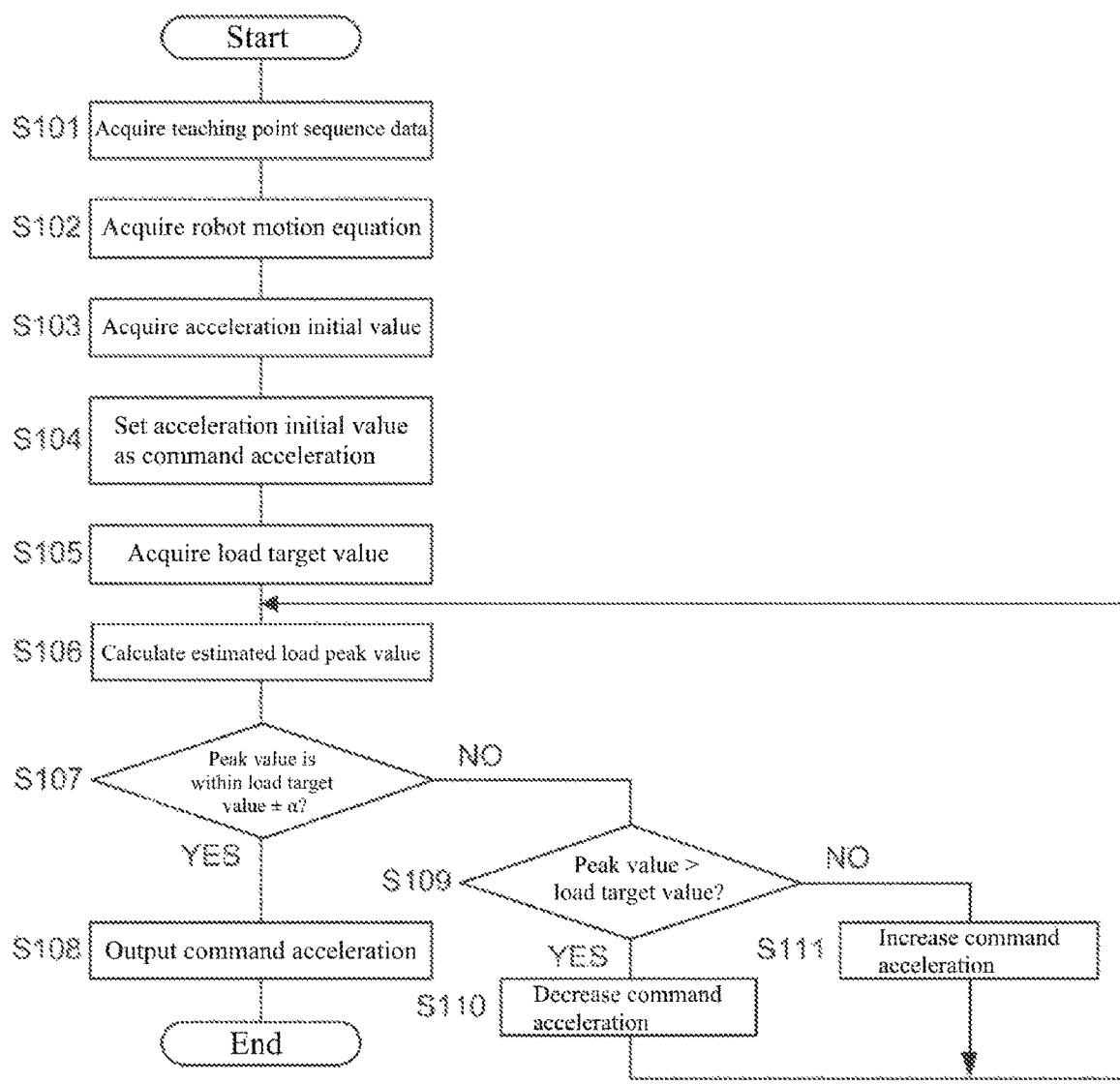
FIG. 5 is a diagram illustrating a flowchart of acceleration adjustment processing performed by the acceleration adjustment apparatus.

FIG. 5 is a flowchart showing a flow of acceleration adjustment processing performed by an acceleration adjustment apparatus. The acceleration adjustment processing is executed by the CPU 11 reading out the acceleration adjustment program from the ROM 12 or the storage 14, loading the program to the RAM 13, and executing the program.

The CPU 11 functions as the load calculation unit 101 and acquires the teaching point sequence data (step S101), and acquires the motion equation of the robot RB (step S102). The CPU 11 functions as the load calculation unit and further acquires the initial value of the acceleration (step S103), and temporarily set the acquired initial value of the acceleration to the command acceleration for moving the robot RB (step S104).

The CPU 11 functions as the acceleration adjustment unit 102 and acquires the load target value (step S105). Note that the value α that is added to/subtracted from the load target value for setting a predetermined range including the load target value may also be input to the acceleration adjustment unit 102 in advance, or acquired with the load target value.

The CPU 11 functions as the load calculation unit 101 and calculates the peak value of the estimated load (torque) that is estimated to act on the robot RB in motion from the teaching point sequence data, the motion equation, and the command acceleration (step S106).

The CPU 11 functions as the acceleration adjustment unit 102 and determines whether the peak value of the estimated load calculated in step S106 is a value within a predetermined range obtained by adding/subtracting the value α to/from the load target value (step S107). If the peak value of the estimated load is within a predetermined range (step S107: YES), the CPU 11 functions as the command output unit 103 and outputs the command acceleration to the robot RB (step S108), and ends the acceleration adjustment processing.

On the other hand, if the peak value of the estimated load is not within a predetermined range (step S107: NO), the CPU 11 determines whether the calculated peak value of estimated load is greater than the load target value (step S109). If the peak value is greater than the load target value (step S109: YES), the CPU 11 adjusts the command acceleration by decreasing it according to a predetermined method (step S110), and returns to the processing of step S106. If the peak value is less than or equal to the load target value (step S109: NO), the CPU 11 adjusts the command acceleration by increasing it according to a predetermined method (step S111), and returns to the processing of step S106. The method for increasing/decreasing the command acceleration in step S110 and step S111 will be described later.

Figure 6:
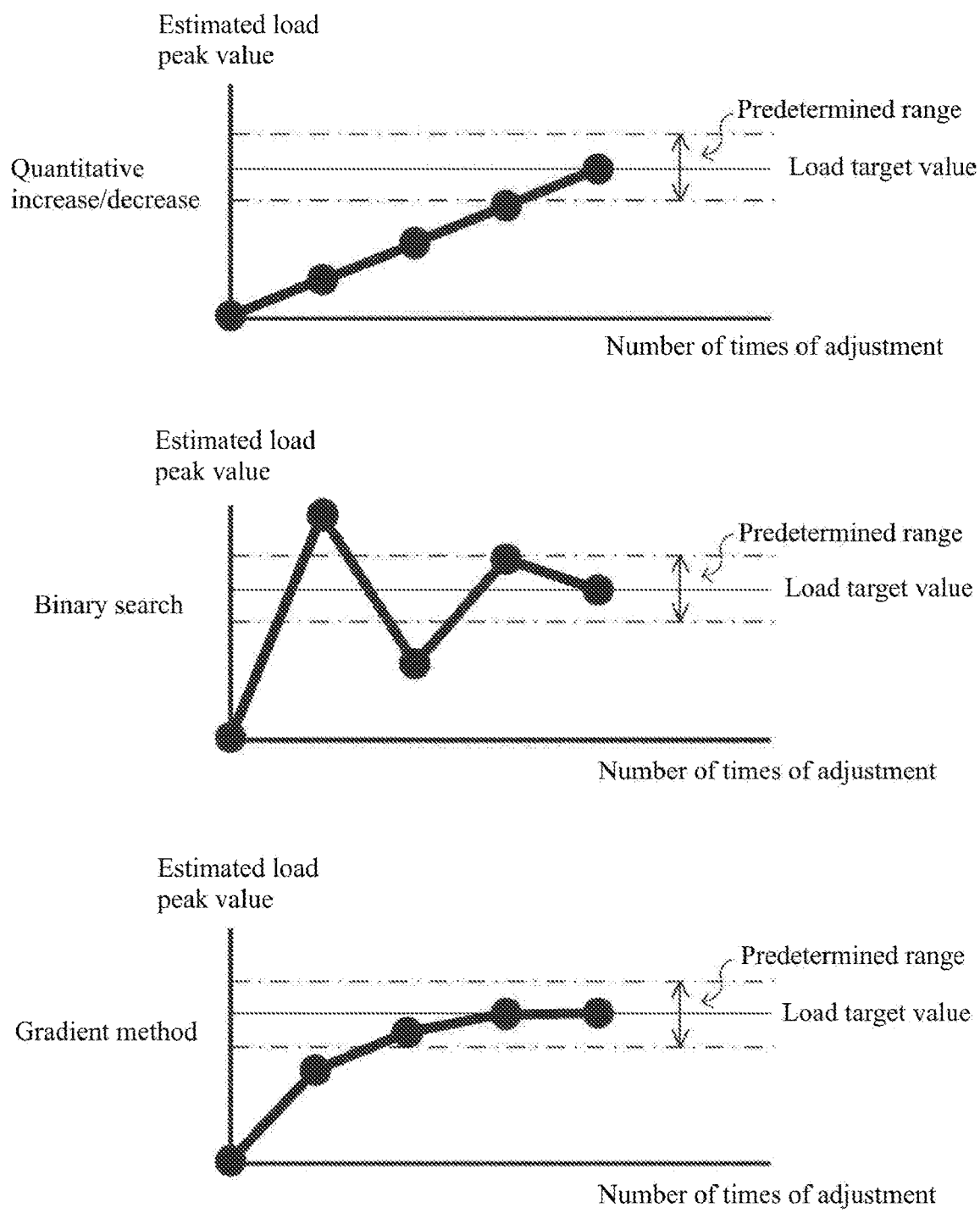
FIG. 6 is a diagram illustrating methods for increasing/decreasing a command acceleration.

FIG. 6 is a diagram showing methods for increasing/decreasing a command acceleration.

In FIG. 6, three examples of the method for increasing/decreasing the command acceleration are shown. The three examples are a quantitative increase/decrease method, a binary search method, and a gradient method.

In the quantitative increase/decrease method, the acceleration is increased/decreased toward the load target value by a constant amount (adjustment width designated by the user). Since the change amount by which the acceleration is increased/decreased is constant, if the change amount is small, the number of times of the acceleration adjustment that is performed until the peak value of the estimated load falls within a predetermined range including the load target value increases. On the other hand, if the change amount is large, the number of times of the acceleration adjustment that is performed until the acceleration approximates the load target value is small. However, if the change amount is too large, there may be cases in which the acceleration exceeds the load target value every time when the acceleration is increased/decreased, and the acceleration never falls within the predetermined range.

In the binary search method, the peak value of the estimated load is approximated to the load target value while decreasing the increasing/decreasing amount by halves. If the binary search is used, the peak value of the estimated load finally falls within a predetermined range without fail.

The gradient method is an optimization algorithm that utilizes a function gradient (partial derivative). The peak value of the estimated load is brought within a predetermined range including the load target value while decreasing the function gradient.

The above-described three methods are merely examples, and it is also possible to bring the peak value of the estimated load within a predetermined range by another method. It is also possible to set, as an end condition, that the peak values of the estimated loads on one or more axes are within a predetermined range, and the peak values of the estimated load on the remaining axes are less than or equal to the load target value.

As described above, according to the acceleration adjustment apparatus 10 of the first embodiment, the accelerations to be supplied to the joints J1 to J6 of the robot RB are adjusted such that the peak value of the estimated load falls within a predetermined range including the load target value. Accordingly, regardless of the user's level of learning about the robot RB, the accelerations of the joints J1 to J6 of the robot RB can be automatically adjusted such that the load falls within a predetermined range including the load target value.

Since the acceleration adjustment apparatus 10 adjusts the acceleration, it is easier to adjust the load acting on the joints J1 to J6, and the takt time can be reduced compared to the case where the acceleration is adjusted. This will be described with reference to FIGS. 7 to 9.

Figure 7:
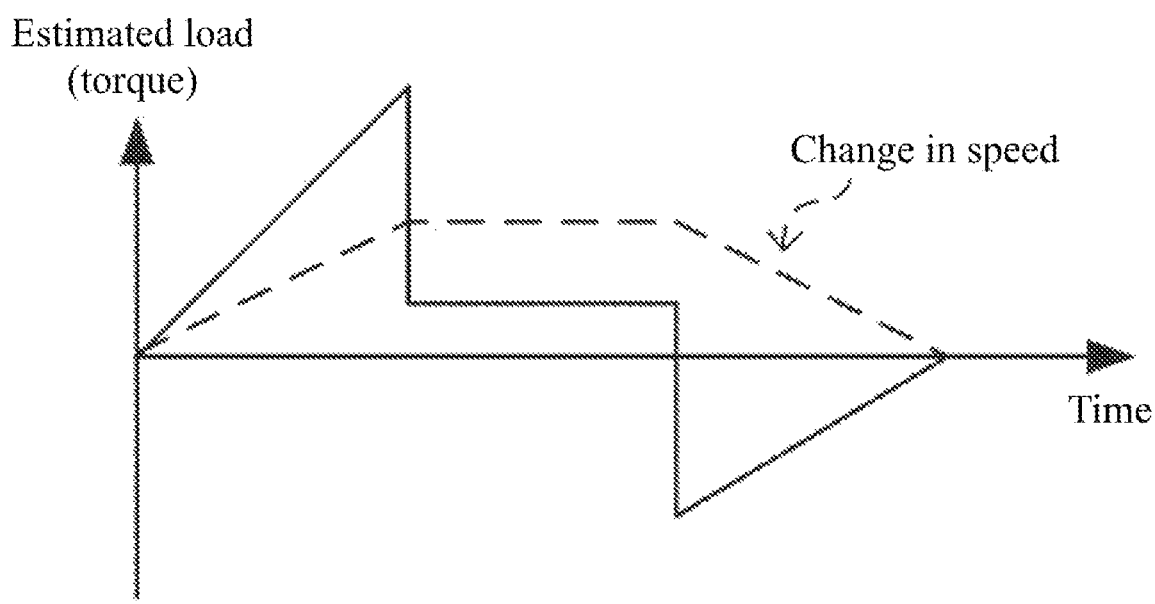
FIG. 7 is a diagram illustrating the relationship between an estimated load and a rotation speed of a joint.
Figure 8:
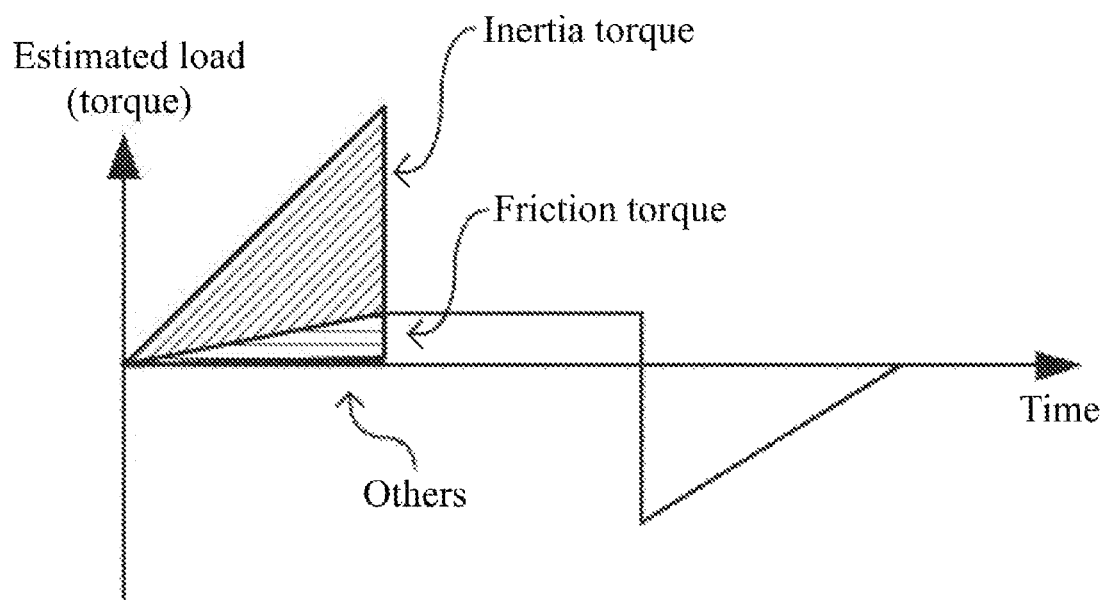
FIG. 8 is a diagram illustrating a profile of an estimated load and torque components included in the profile.
Figure 9:
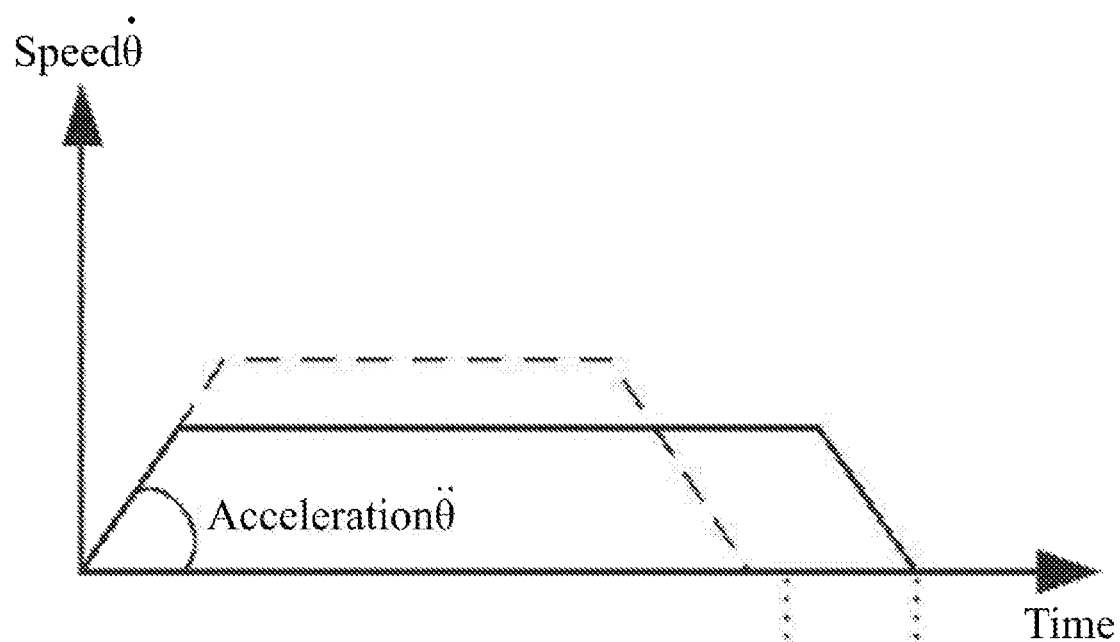
FIG. 9 is a diagram illustrating a change in takt time in a case where speed is decreased and in a case where acceleration is decreased.
Figure 9:
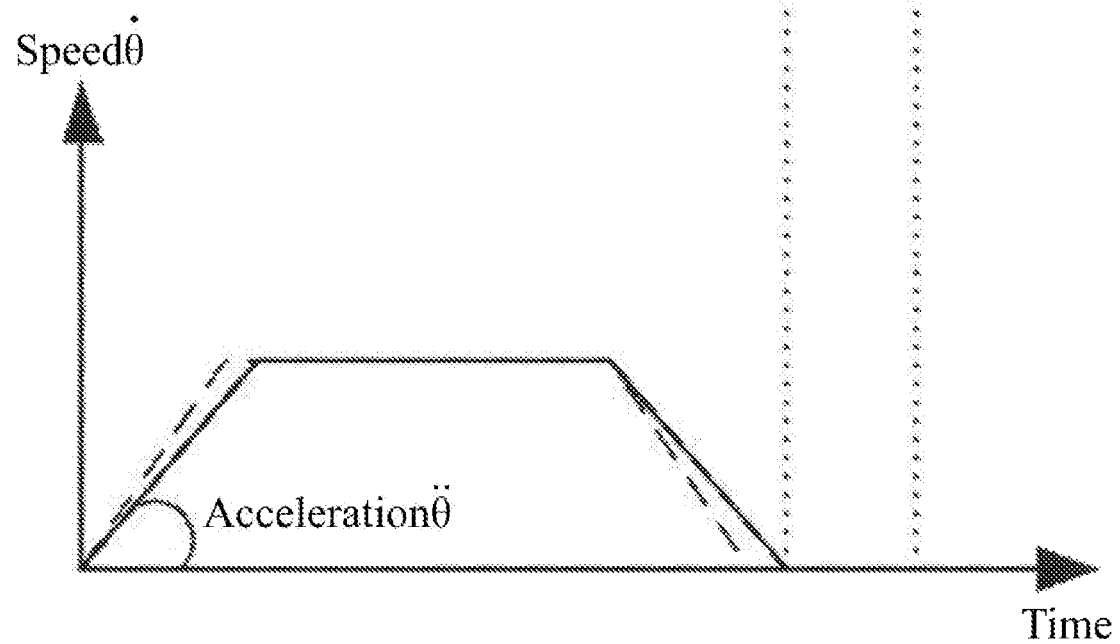

FIG. 7 is a diagram showing a relationship between an estimated load and a rotation speed of a joint. FIG. 8 is a diagram showing a profile of an estimated load and torque components included in the profile. FIG. 9 is a diagram showing a change in takt time in case where a speed is decreased and in case where an acceleration is decreased.

In FIG. 7, the horizontal axis indicates time, and the vertical axis indicates the estimated load acting on the joints. Also, in FIG. 7, changes in the speed of the joints are indicated by the dotted line. As shown in FIG. 7, the estimated load increases accompanied with an increase in the speed. When the speed starts to decrease, the code of the estimated load inverses and the estimated load increases.

Here, as shown in FIG. 8, an inertia torque, a friction torque, and other forces can be represented as components constituting the estimated load by using the profile of the estimated load. When the estimated load is denoted by T, the inertia torque, a friction torque, and other forces can be represented by the following equation.

Equation 1

$$\tau = M(\theta)\ddot{\theta} + V(\theta,\dot{\theta}) + F(\dot{\theta}) + G(\theta) \qquad \text{Formula (1)}$$

τ: estimated load (torque), M(θ): matrix regarding mass
V(θ, $\dot{\theta}$): torque by centrifugal force and Coriolis force
F($\dot{\theta}$): friction torque, G(θ): gravity torque, M(θ)$\ddot{\theta}$: inertia torque According to the above equation (1) and FIG. 8, the inertia torque is determined based on the magnitude of the acceleration, and the friction torque is determined based on the magnitude of the speed. In particular, as shown in FIG. 8, it is obvious that the influence of the inertia torque on the estimated load is greater than the friction torque. Accordingly, by decreasing only the speed, it is not possible to tell whether the inertia torque can be effectively decreased or to tell whether the target load value can be approximated. In the first place, when the target load value or the acceptable load value is exceeded by only the inertia torque, even if only the speed is decreased, the load cannot be suppressed to the target load value or less. On the other hand, typically there is no case where the target load value or the allowable load value is exceeded by only the friction torque. This is because, the allowable value of the speed is defined by the specifications as well, and if the speed falls within the allowable value, the friction torque does not exceed the allowable load value. Accordingly, it is possible to suppress the estimated load to the target load by merely adjusting the acceleration.

As described above, from the viewpoint of the load component, it is obvious that adjusting the acceleration as described in the above embodiment is more effective than adjusting the speed.

Furthermore, as shown in the upper figure in FIG. 9, if the speed is decreased, it is necessary to increase the variation of the parameters compared to the case where the acceleration is decreased. In other words, even though the change rate is smaller, decreasing the acceleration can reduce the load by the same degree as decreasing the speed. For this reason, it takes shorter operation time to decrease the acceleration than decreasing the speed. As a result, as shown in FIG. 9, the takt time is shorter in the case where the acceleration is adjusted than in the case where the same load is adjusted based on the speed.

As described above, from the viewpoint of takt time, it is obvious that adjusting the acceleration as in the above-described embodiment is more effective than adjusting the speed.

Second Embodiment

In the first embodiment, the acceleration is adjusted over the entirety of the path of the robot RB according to the load target value. In a second embodiment, the path of the robot RB is divided into a plurality of sections and the acceleration is adjusted for each section.

Hereinafter, an acceleration adjustment apparatus 10 of the second embodiment will be described.

Figure 10:
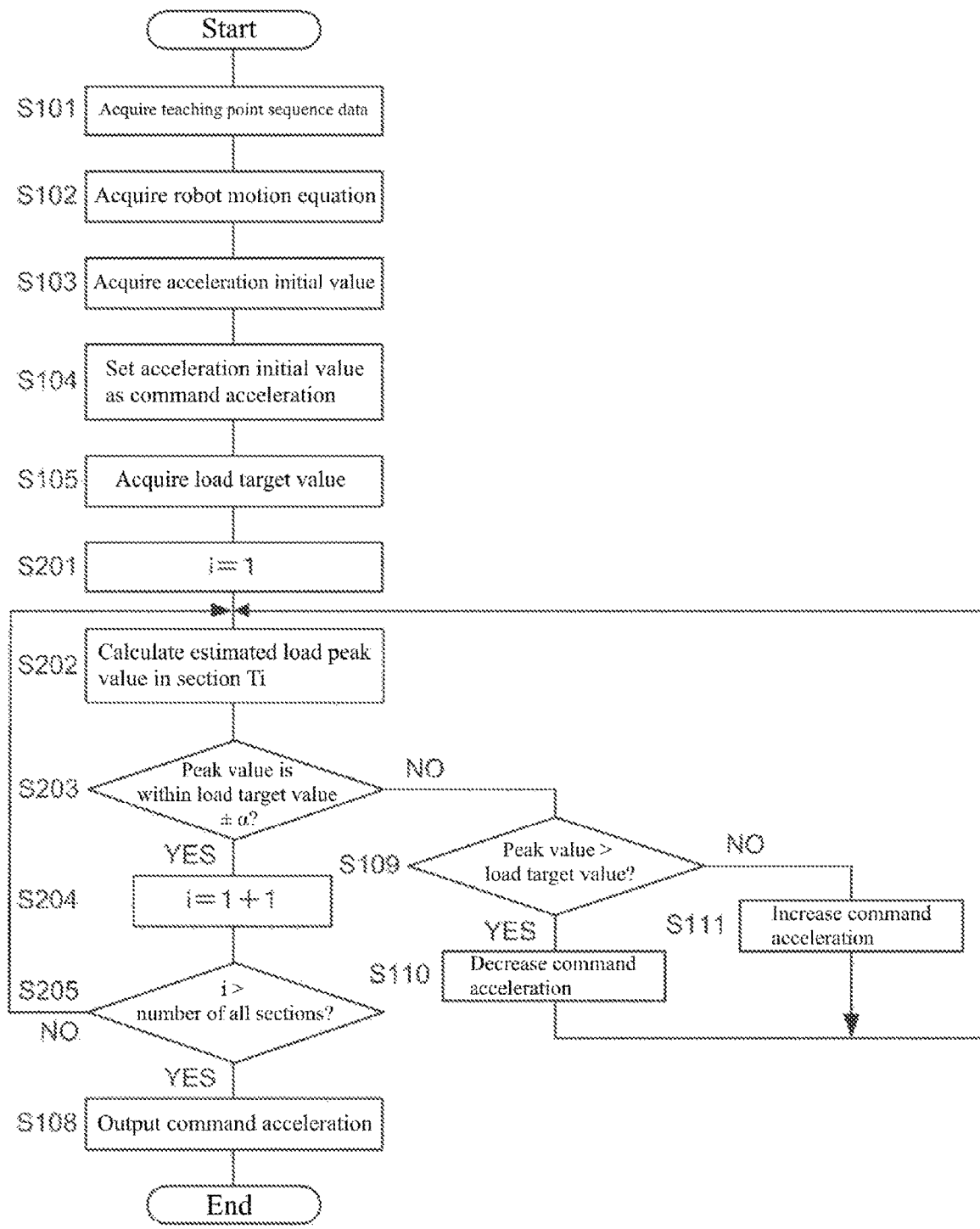
FIG. 10 is a flowchart illustrating a flow of acceleration adjustment processing performed by an acceleration adjustment apparatus according to a second embodiment.

FIG. 10 is a flowchart showing a flow of acceleration adjustment processing performed by the acceleration adjustment apparatus according to the second embodiment. The acceleration adjustment processing is executed by the CPU 11 reading out the acceleration adjustment program from the ROM 12 or the storage 14, loading the program to the RAM 13, and executing the program. Also, in the steps of processing shown in FIG. 10, steps similar to the acceleration adjustment processing of the first embodiment shown in FIG. 5 are given the same step numbers and the detailed description thereof is omitted.

Following the processing of the steps S101 to S105, the CPU 11 assigns 1 to a variable i (step S201). The CPU 11 extracts the path of the robot RB in a section Ti from the teaching point sequence data acquired in step S101, and calculates the peak value of the estimated load in the extracted path based on the motion equation of the robot RB and the acceleration acquired in step S102 (step S202). Note that the method for dividing the entire path of the robot RB into the sections Ti will be described later.

The CPU 11 determines whether the peak value calculated in step S202 is a value within a predetermined range obtained by adding/subtracting the value α to/from the load target value (step S203). If the peak value of the estimated load is not within the predetermined range (step S203: NO), the CPU 11 advances to processing in step S109 in order to adjust the acceleration. On the other hand, if the peak value of the estimated load is within the predetermined range (step S203: YES), the CPU 11 increments the variable i by 1 (step S204). The CPU 11 determines whether the variable i is greater than the number of all the sections as a result of incrementing i in step S204 (step S205). This is because if the variable i is greater than the number of all the sections, adjustment of the acceleration is completed for all the sections.

If i is not greater than the number of all the sections (step S205: NO), the CPU 11 returns to processing in step S202. If i is greater than the number of all the sections (step S205:

YES), the CPU 11 outputs an operation command to the robot RB based on the adjusted acceleration (step S108).

As described above, in the second embodiment, since the acceleration is adjusted based on the load target value for each section Ti, the optimum acceleration can be obtained for each section, and as a result, the takt time can be made shorter than in the first embodiment.

Next, the method for dividing the entire path of the robot RB into the sections Ti will be described.

Figure 11:
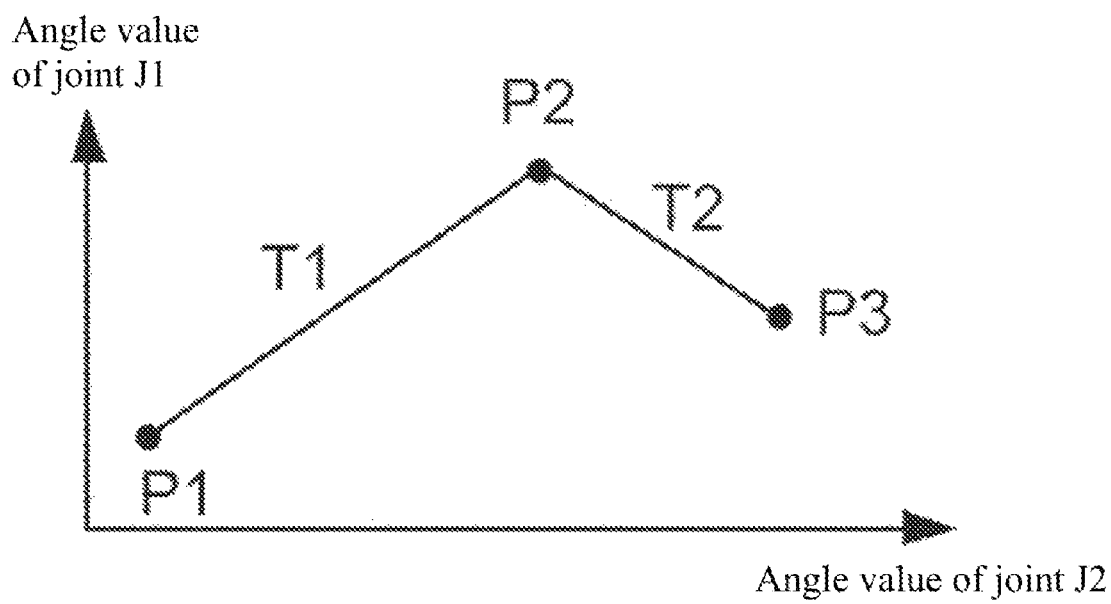
FIG. 11 is a diagram illustrating a graph of an angle value of a joint on a path of a robot.

FIG. 11 is a diagram showing a graph of the angle values of the joints on a path of a robot.

In FIG. 11, for simplifying the description, only the graph of the angle values of the joint J1 and the joint J2 are two-dimensionally shown in the coordinate space. However, in actuality, the graphs of the angle values of all the joints J1 to J6 are considered in the six-dimensional coordinate space.

Points P1 to P3 indicate the passing points through which the robot RB passes. The passing points are given as teaching points, for example. As shown in FIG. 11, when moving from the point P1 to the point P3, the tendency of the change of the angle values of the joint J1 and the joint J2 changes at the point P2. In other words, the speed of the joint J1 and the joint J2 changes at the point P2. In this manner, at the point P2, where the tendency of the change of the angle values such as the speed changes, a section of the path is defined. As a result, the section from the point P1 to the point P2 is set as a section T1, and the section from the point P2 to the point P3 is set as a section T2.

Next, the command values that are supplied to the robot RB for the operations in each section will be described in more detail. In particular, the aspect that the command values in the adjacent sections interact with each other when the path is divided into a plurality of sections will be described.

Figure 12:
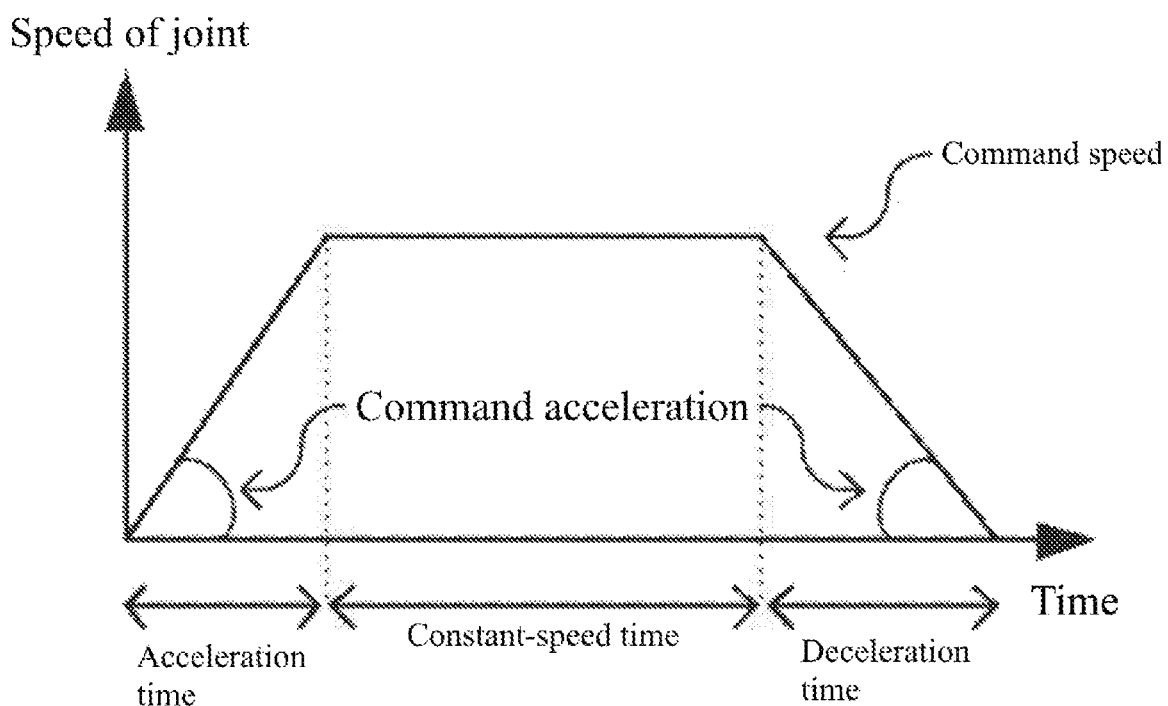
FIG. 12 is a diagram illustrating a profile of a command speed in one section.
Figure 13:
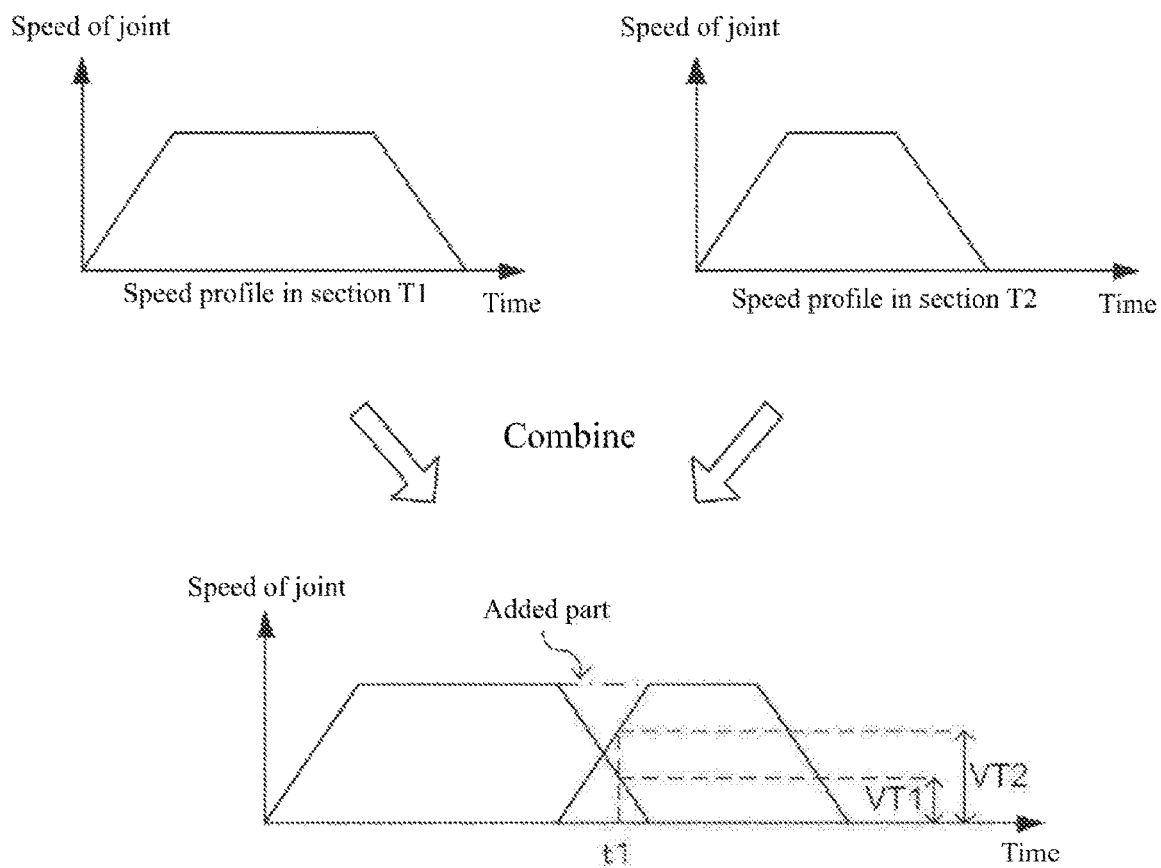
FIG. 13 is a diagram illustrating how profiles of command speeds in adjacent sections are synthesized.
Figure 14:
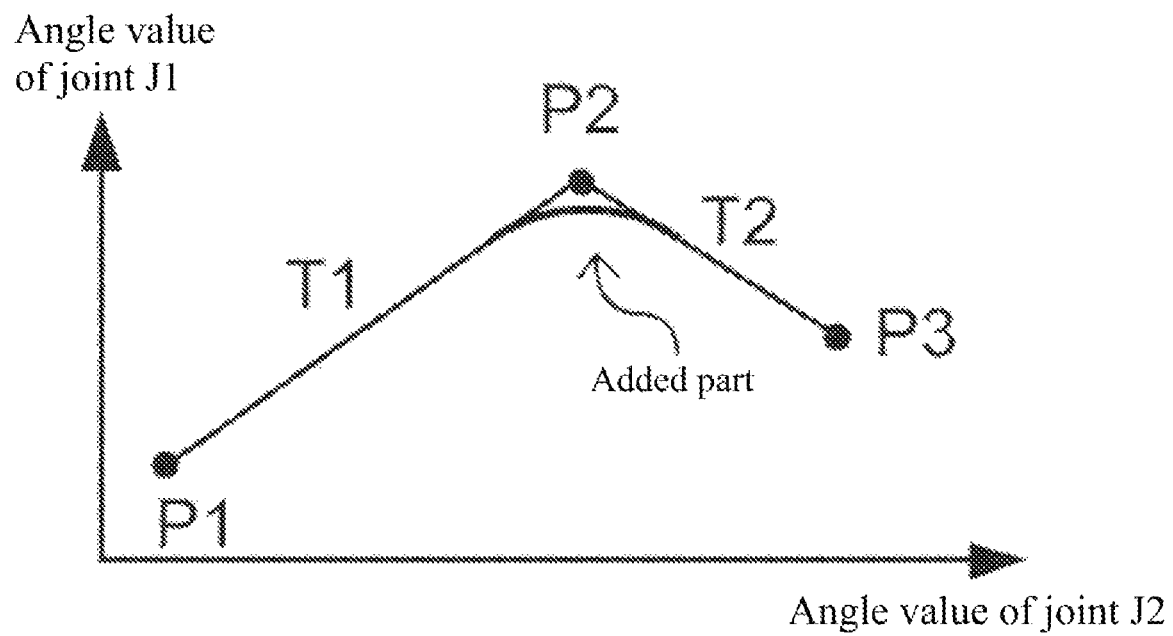
FIG. 14 is a diagram illustrating a graph of the angle value of a joint when speed profiles in adjacent sections are synthesized.

FIG. 12 is a diagram showing a profile of a command speed in one section. FIG. 13 is a diagram showing how profiles of command speeds in adjacent sections are synthesized. FIG. 14 is a diagram showing a graph of angle values of the joints when speed profiles in adjacent sections are synthesized.

In FIG. 12, the vertical axis indicates the speed of the joints, and the horizontal axis indicates time. As shown in FIG. 12, the command value of the speed (command speed) and the command acceleration with respect to joints J1 to J6 are set for each section. In this embodiment, the command speed is set in advance targeting the maximum speed that is allowable for the robot RB, and the command acceleration is adjusted and set through the acceleration adjustment processing in FIG. 10. The command value is given by a trapezoidal speed profile as shown in FIG. 12, or if there is no constant-speed time, a triangular speed profile.

As shown in the upper diagrams in FIG. 13, it is assumed that the speed profiles in adjacent sections T1 and T2 are set through the adjustment of the acceleration in FIG. 10. In the speed profile in the section T1, the speed is decreased from the command speed to 0 in the deceleration time. In the speed profile in section T2, the speed is increased from 0 to the command speed same as that in the section T1 in the acceleration time. Accordingly, if the profile in the section T2 directly follows the profile in the section T1, although the speed is increased to the same command speed in the section T2, the speed is decreased in the section T1. These deceleration and acceleration are needless. Accordingly, as shown in the lower diagram in FIG. 13, the deceleration time in the section T1 and the acceleration time in the section T2 are overlapped and the command values are added up. At time t1, for example, a command speed VT1 in the section T1 and a command speed VT2 in the section T2 are added up. As a result of this, the command speed that is the same as that of the constant-speed portions in the sections T1 and T2 can be obtained. In this manner, by adding up the command values of the combined portions, the command value in the added up portion indicated by the one-dot chain line in the diagram can be obtained. In the example shown in FIG. 13, the constant-speed portions in the sections T1 and T2 are connected to be continuous.

By overlapping the command values in the declaration time and acceleration time in the adjacent sections T1 and T2 with each other, the path through which the robot RB passes changes. Originally, as shown in FIG. 11, the vectors of the angle values are set such that the robot RB moves from the point P1, the point P2, and the point P3 in the stated order. However, by adding up the command values partially in the sections T1 and T2, as shown in FIG. 14, the robot RB smoothly moves from the section T1 to the section T2 without passing the point P2.

As described above, based on the result of the acceleration adjustment processing in FIG. 10, first, the speed profile is generated for each section, and by synthesizing the command speeds of the deceleration time and the acceleration time in the adjacent sections, the motion of the robot RB can be made smoother.

Figure 15:
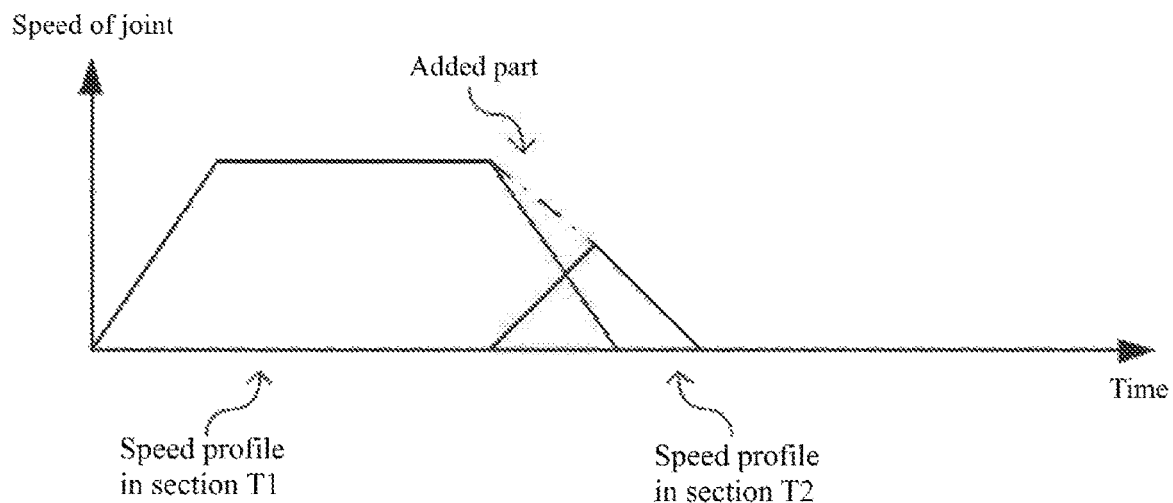
FIG. 15 is a diagram illustrating another example in which speed profiles in adjacent sections are synthesized.
Figure 16:
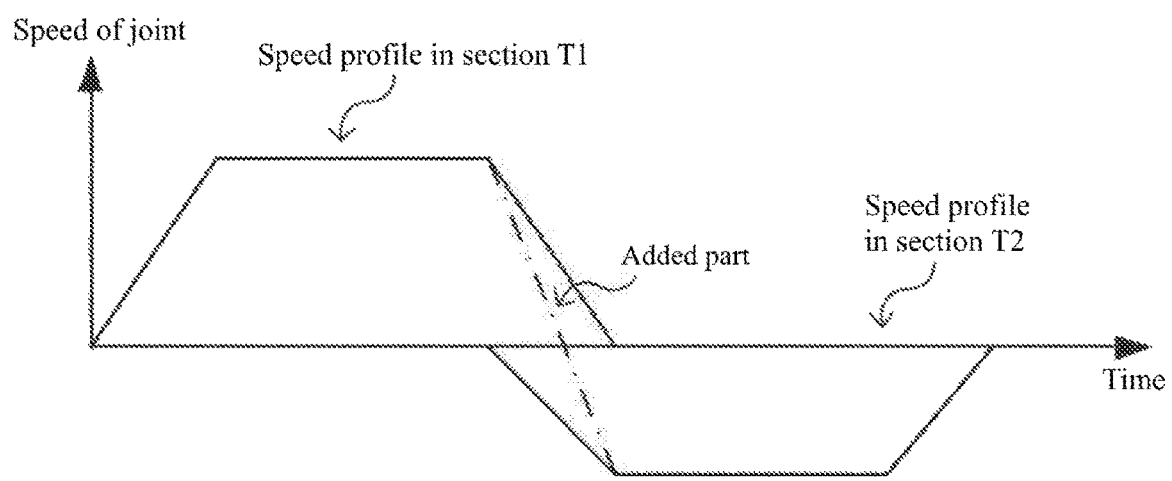
FIG. 16 is a diagram illustrating another example in which speed profiles in adjacent sections are synthesized.

FIG. 15 and FIG. 16 are diagrams showing another example in which speed profiles in adjacent sections are synthesized.

As shown in FIG. 15, even when the maximum speed of the section T2 is smaller than the maximum speed in the section T1, the command speeds in the deceleration time in the section T1 and the acceleration time in the section T2 can be added up as indicated by the one-dot chain line.

Also, as shown in FIG. 16, even when the speed is inverted in the section T2, the command speeds in the deceleration time in the section T1 and the acceleration (minus) time in the section T2 can be added up as indicated by the one-dot chain line. As a result of the totalization, the absolute value of the command acceleration is greater than that of the command acceleration of the deceleration time in the section T1 and the command acceleration of the acceleration time in the section T2. As a result of the acceleration being increased, the load on the robot RB also increases.

Third Embodiment

In the first embodiment and the second embodiment, a case where the path of the robot RB is taught was described. In a third embodiment, the acceleration adjustment apparatus 10 generates a path of the robot RB on its own.

Figure 17:
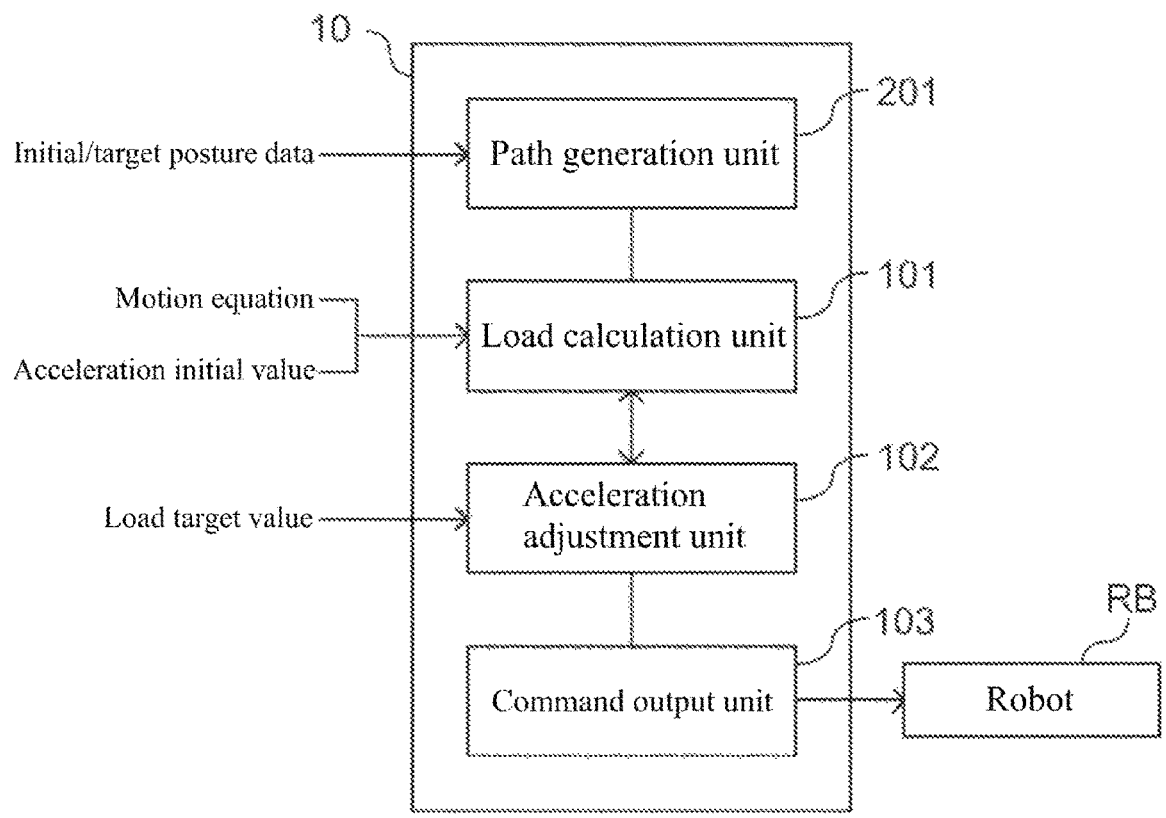
FIG. 17 is a block diagram illustrating a functional configuration of an acceleration adjustment apparatus according to a third embodiment.

FIG. 17 is a block diagram showing a functional configuration of an acceleration adjustment apparatus according to the third embodiment.

The acceleration adjustment apparatus 10 of the third embodiment includes a path generating unit 201 in addition to the functional configuration of the acceleration adjustment apparatus 10 of the first embodiment shown in FIG. 4. The path generating unit 201 is realized by the CPU 11 reading out an acceleration adjustment program stored in the ROM 12 or the storage 14, loading the program to the RAM 13, and executing the program.

The path generating unit 201 acquires an initial posture data and a final target posture data of the robot RB. The initial posture data and the target posture data are given as six-dimensional vectors having the angle values of the rotation of the joints J1 to J6 of the robot RB, for example.

The path generating unit 201 generates a path along which the robot RB operates, in other words, passing points through which the robot RB passes, from the initial posture indicated by the initial posture data to the target posture indicated by the target posture data. Generation of the passing points will be described in detail later.

Figure 18:
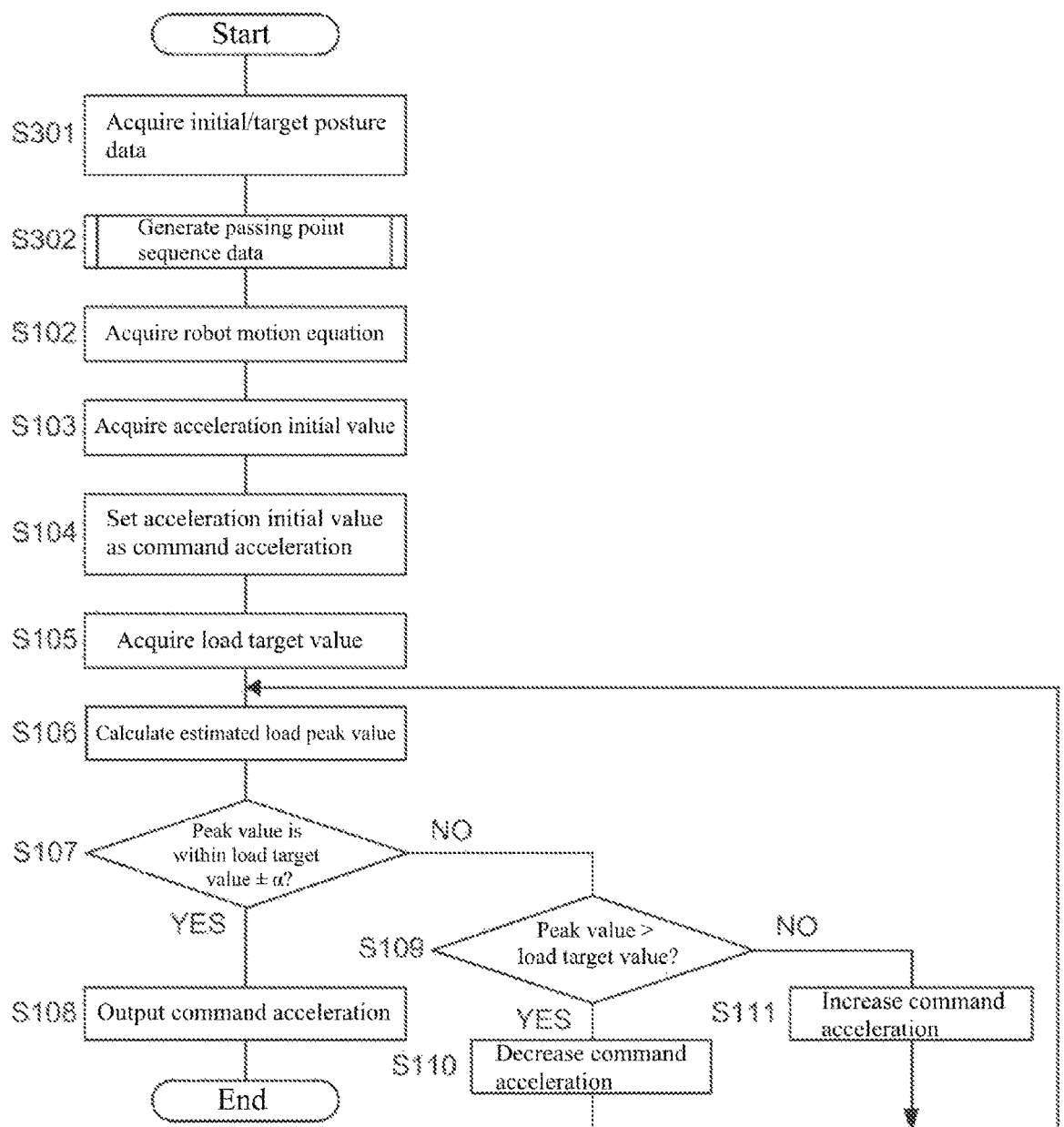
FIG. 18 is a diagram illustrating a flowchart of acceleration adjustment processing performed by the acceleration adjustment apparatus according to a third embodiment.
Figure 19:
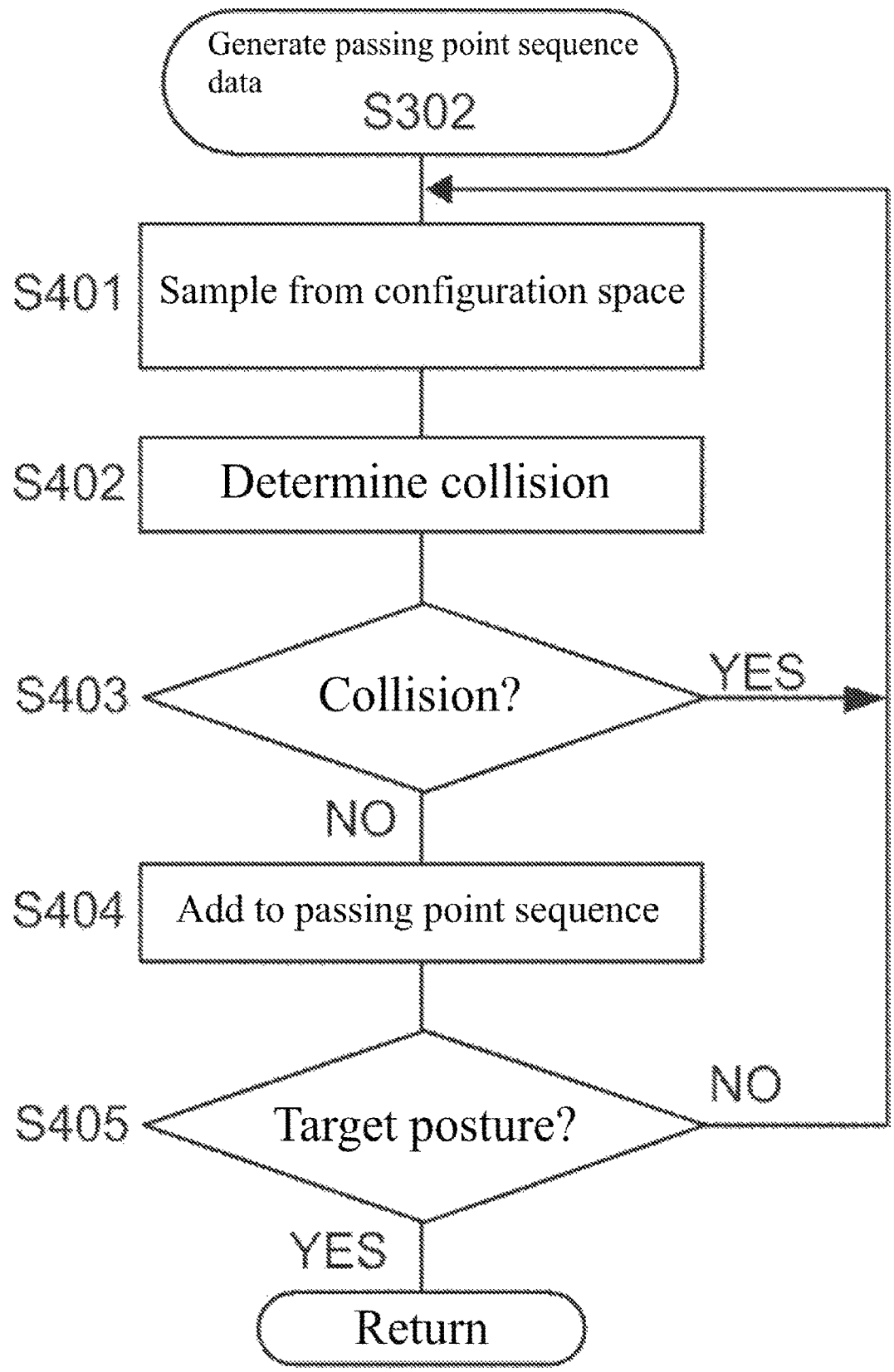
FIG. 19 is a diagram illustrating a flowchart of passing point generation processing for generating a passing point.

FIG. 18 is a flowchart showing a flow of acceleration adjustment processing performed by the acceleration adjustment apparatus according to the third embodiment. FIG. 19 is a flowchart showing a flow of passing point generation processing for generating a passing point. The acceleration adjustment processing in FIG. 18 and the passing point generation processing in FIG. 19 are executed by the CPU 11 reading out the acceleration adjustment program and the passing point generation program from the ROM 12 or the storage 14, loading the program to the RAM 13, and executing the program. Also, of the steps of processing shown in FIG. 18, the steps similar to that of the acceleration adjustment processing of the first embodiment shown in FIG. 5 are given the same step numbers and the detailed description thereof is omitted.

The CPU 11 acquires initial posture data and target posture data of the robot RB (step S301). The CPU 11 generates passing point sequence data of the robot RB from the acquired initial posture data and target posture data (step S302). The subsequent processing is similar to that shown in FIG. 5.

Generation of the passing point sequence data will be illustrated with reference to FIG. 19. There are various kinds of path generation algorithms. Examples of path generation algorithm include a random sampling method such as a PRM (Probabilistic Roadmap Method) and an RRT (Rapidly exploring Random Tree). In addition, optimization method such as a STOMP (Stochastic Trajectory Optimization for Motion Planning) and a CHOMP (Covariant Hamiltonian Optimization for Motion Planning) may also be applied. By applying a path generation algorithm as described above, the path from the initial posture to the target posture can be quickly generated. Any method can be applied to generate the path. Hereinafter, description will be made taking the RRT as an example.

The CPU 11 samples one point from a configuration space (step S401). The CPU 11 samples, for example, a point indicated by the initial posture data, or a point that is closest to a passing point that has been already generated. Here, "configuration space" means a space represented as a group of postures (vectors having dimensions of the number of the joints) that the robot RB can take.

The CPU 11 determines whether the robot RB interferes with the robot RB itself, or whether the robot RB collides with another device or equipment when the posture at the sampled point is taken by the robot RB (step S402). Note that although it is not described above, in order to determine self-interference or collision with other devices or the like, the CPU 11 uses a simulation model including information regarding the shapes, mechanisms, and the like.

As a result of step S402, if it is determined that a collision will occur (step S403: YES), it is not possible to implement the point sampled this time, and therefore the CPU 11 returns to processing in step S401 in order to sample another point.

If it is determined that no collision will occur (step S403: NO), the CPU 11 adds the sampled point to the passing point sequence (step S404). The CPU 11 determines whether the passing point sequence has reached the target posture (step S405).

If the target posture has not been reached (step S405: NO), the CPU 11 returns to processing in step S401 in order to add the next passing point. If the target posture has been reached (step S405: YES), the CPU 11 ends the passing point generation processing and returns to the acceleration adjustment processing.

As described above, in the case of generating the passing points as well, the acceleration adjustment processing can be appropriately applied. Note that, after generating the passing points, as shown in FIG. 10, the path can be divided into a plurality of sections and the acceleration can also be adjusted for each section. Also, a step of smoothing can also be included in generation of passing points. A path pruning method or a shortcut method can be applied as a specific method for smoothing.

Note that the acceleration adjustment processing and the path generation processing that are executed by the CPU reading software (program) in the above embodiments may be executed by any of various types of processors other than the CPU. Examples of the processor in this case include a PLD (programmable logic device) whose circuit configuration can be changed after manufacturing such as an FPGA (field-programmable gate array), a dedicated electric circuit that is a processor having a circuit configuration designed dedicatedly for executing specific processing such as an ASIC (application specific integrated circuit), and the like. In addition, the acceleration adjustment processing and the path generation processing may be executed by one of these various processors, or may be executed by a combination of two or more processors of the same type or different types (a plurality of FPGAs, a combination of a CPU, an FPGA, etc.). In addition, as more specific hardware structures of these various types of processors, an electric circuit acquired by combining circuit elements such as semiconductor elements is provided.

In addition, in the above embodiments, an aspect has been described in which an acceleration adjustment processing program and path generation processing program are stored (installed) in the ROM 12 or the storage 14 in advance, but there is no limitation thereto. The program may be provided by being recorded in a non-transitory recording medium such as a CD-ROM (compact disk read only memory), a DVD-ROM (digital versatile disk read only memory), or a USB (universal serial bus) memory. In addition, an aspect may be adopted in which the program is downloaded from an external apparatus via a network.

The invention claimed is:

1. An acceleration adjustment apparatus comprising a processor configured to perform operations comprising:
   calculating a peak value of a load that is estimated to act on a robot, based on a motion equation regarding a motion of the robot and a value of an acceleration of a joint of the robot in motion; and
   executing, based on the calculated peak value of the load, at least one of a first adjustment in which, when the calculated peak value of the load is greater than a target value of the load acting on the robot when the robot is moving, the acceleration is adjusted to decrease, and a second adjustment in which, when the calculated peak value of the load is less than the target value, the acceleration is adjusted to increase, wherein
   calculating the peak value of the load and executing the at least one of the first adjustment and the second adjustment of the acceleration based on the calculated peak value of the load are repeated until the calculated peak value of the load calculated based on the acceleration of the joint of the robot and the motion equation falls within a predetermined range including the target value, and a number of times that calculating the peak value of the load and executing the at least one of the first adjustment and the second adjustment of the acceleration based on the calculated peak value of the load are repeated is increased or decreased based on the difference between the calculated peak value of the load and the target value and the change amount of the at least one first adjustment and the second adjustment.

2. The acceleration adjustment apparatus according to claim 1, wherein a trajectory along which the robot operates is divided into a plurality of sections, and the processor is configured to perform operations such that executing the at least one of the first adjustment and the second adjustment comprises executing the at least one of the first adjustment and the second adjustment to adjust the acceleration for each of the sections.

3. The acceleration adjustment apparatus according to claim 2, wherein the trajectory along which the robot operates is divided into the plurality of sections by being divided at a point at which a tendency of change of an angle value of the joint of the robot changes.

4. The acceleration adjustment apparatus according to claim 1, wherein the processor is configured to perform operations such that executing the at least one of the first adjustment and the second adjustment comprises executing the at least one of the first adjustment and the second adjustment to adjust the acceleration by using a user-designated adjustment width, an adjustment value acquired through a binary search method, or an adjustment value acquired through a gradient method.

5. The acceleration adjustment apparatus according to claim 1, wherein a trajectory along which the robot operates is divided into a plurality of sections, and the processor is configured to perform operations such that executing the at least one of the first adjustment and the second adjustment comprises executing the at least one of the first adjustment and the second adjustment to adjust the acceleration for each of the sections.

6. The acceleration adjustment apparatus according to claim 5, wherein the trajectory along which the robot operates is divided into the plurality of sections by being divided at a point at which a tendency of change of an angle value of the joint of the robot changes.

7. The acceleration adjustment apparatus according to claim 1, wherein the processor is configured to perform operations such that executing the at least one of the first adjustment and the second adjustment comprises executing the at least one of the first adjustment and the second adjustment to adjust the acceleration by using a user-designated adjustment width, an adjustment value acquired through a binary search method, or an adjustment value acquired through a gradient method.

8. A non-transitory computer-readable storage medium storing an acceleration adjustment program, which when read and executed, causes a computer to perform operations comprising;

calculating a peak value of a load that is estimated to act on a robot, based on a motion equation regarding a motion of the robot and a value of an acceleration of a joint of the robot in motion; and executing, based on the calculated peak value of the load, at least one of a first adjustment in which, when the peak value of the load calculated is greater than a target value of the load acting on the robot when the robot is moving, the acceleration is adjusted to decrease, and a second adjustment in which, when the peak value of the load calculated is less than the target value, the acceleration is adjusted to increase, wherein executing the calculating the peak value of the load and executing the at least one of the first adjustment and the second adjustment of the acceleration are repeated until the calculated peak value of the load calculated based on the acceleration of the joint of the robot and the motion equation falls within a predetermined range including the target value, and a number of times that calculating the peak value of the load and executing the at least one of the first adjustment and the second adjustment of the acceleration based on the calculated peak value of the load are repeated is increased or decreased based on the difference between the calculated peak value of the load and the target value and the change amount of the at least one first adjustment and the second adjustment.

* * * * *